United States Patent [19]

Hellinga et al.

[11] Patent Number: 5,299,143
[45] Date of Patent: Mar. 29, 1994

[54] DISPLACEMENT DETECTING APPARATUS

[75] Inventors: Richard J. Hellinga; Masakazu Nakazato; Yoichi Shimoura; Hideki Yamagata, all of Sagamihara, Japan

[73] Assignee: Kayaba Kogyo Kabushiki Kaisha, Tokyo, Japan

[21] Appl. No.: 763,733

[22] Filed: Sep. 23, 1991

[30] Foreign Application Priority Data

Sep. 28, 1990 [JP] Japan .................. 2-258901

[51] Int. Cl.$^5$ .............................. G01B 7/14
[52] U.S. Cl. .................. 364/561; 364/474.35; 364/167.01; 364/182; 364/559; 324/207.12; 324/207.23; 324/207.24; 324/239
[58] Field of Search ............. 364/561, 474, 35, 559, 364/167.01, 176, 182, 560; 324/207.12, 207.24, 207.23, 233, 234, 235, 236, 239, 243; 341/15

[56] References Cited

U.S. PATENT DOCUMENTS

| | | | |
|---|---|---|---|
| 4,293,814 | 10/1981 | Boyer | 324/207.12 |
| 4,672,317 | 6/1987 | Indo | 324/207.12 |
| 4,754,411 | 6/1988 | Wason | 364/560 |
| 4,775,926 | 10/1988 | Hasegawa et al. | 364/474.35 |
| 4,811,254 | 3/1989 | Iijima et al. | 364/561 |
| 4,884,226 | 11/1989 | Sakano | 364/559 |
| 4,949,037 | 8/1990 | Abe | 324/239 |
| 5,019,776 | 5/1991 | Kawamata et al. | 324/207.24 |

Primary Examiner—Jack B. Harvey
Assistant Examiner—Hal D. Wachsman
Attorney, Agent, or Firm—Jordan and Hamburg

[57] ABSTRACT

A magnetic scale formed by arranging a non-magnetic material at a predetermined pitch in the direction of motion of a piston rod, and a pair of magnetic sensors which output two sine waves with a phase difference of 90° corresponding to the pitch of said magnetic scale, are provided. The peak voltages of the sensor output at each pitch of the magnetic scale are updated and stored. Center voltages are computed from the peak voltages at each pitch, and a coarse displacement is computed based on the result of comparing the center voltages and sensor outputs. Correction coefficients of the sensor outputs are computed from the peak voltages and center voltages, and the sensor outputs are compensated based on these correction coefficients. A fine displacement is then computed by an inverse trigonometric function from the two corrected signals, and a displacement signal is output by adding the coarse displacement to the fine displacement.

15 Claims, 10 Drawing Sheets

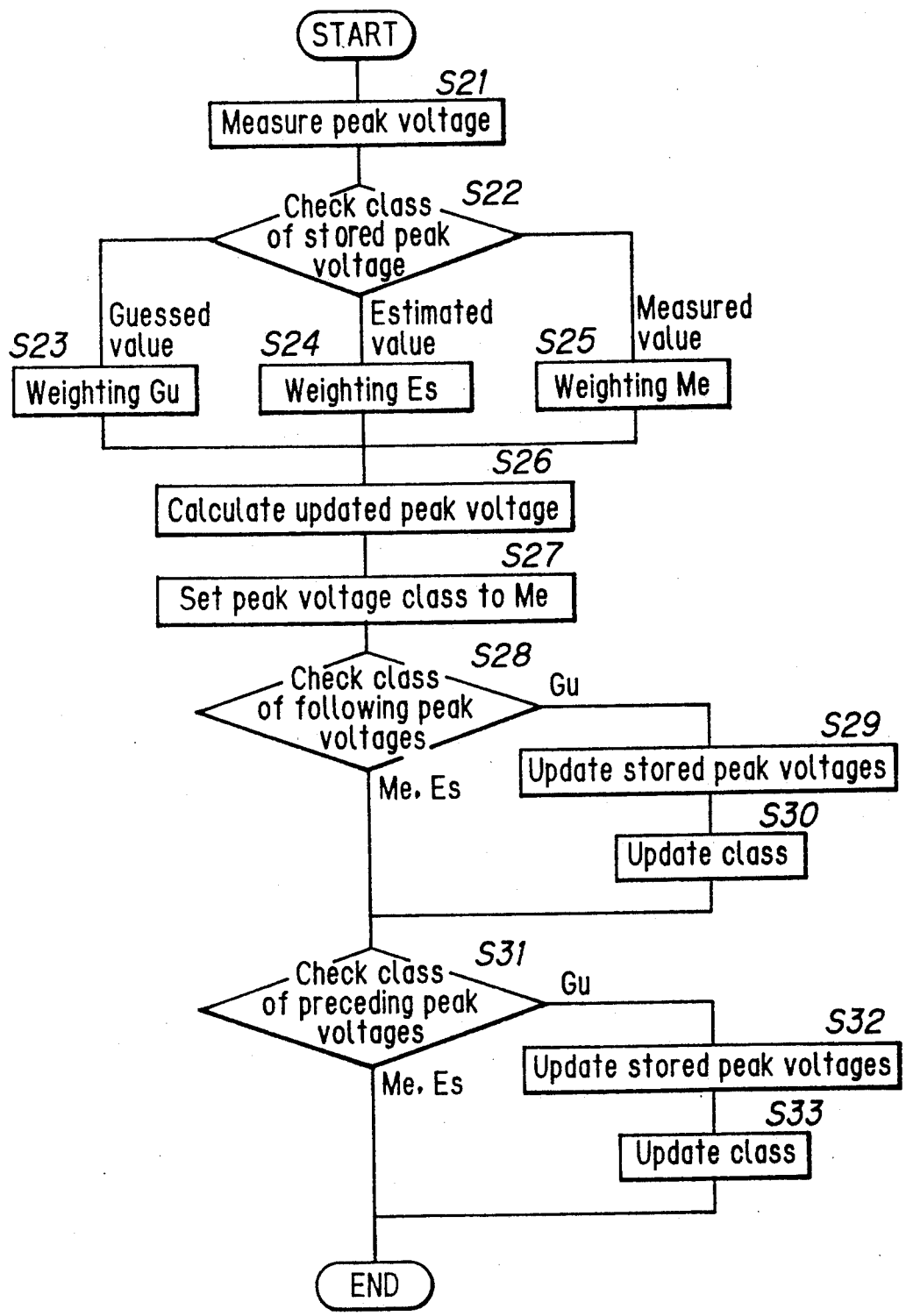

DISPLACEMENT DETECTING APPARATUS

BACKGROUND OF THE INVENTION

This invention relates to an apparatus for detecting, for example, the displacement of a piston rod in a hydraulic cylinder.

An apparatus wherein pieces of a non-magnetic material are embedded in the surface of a piston rod at a fixed pitch interval in the axial direction to form a magnetic scale, and the sinusoidal variation of the output signal from a sensor attached to the side of a cylinder due to the motion of the piston rod is used to detect the displacement of the piston rod with high precision, has been disclosed by the Applicant and several others (Tokkaisho No. 63-263418, Tokkaihei No. 1-269015, Tokkaihei No. 2-105013 and other applications published by the Japanese Patent Office).

This magnetic sensor outputs a sine wave of one cycle for each pitch of the magnetic scale due to the motion of the piston rod, and by installing a pair of magnetic sensors in the axial direction of the piston rod such that two sine waves are output with a phase difference of 90°, the displacement of the rod within each pitch can be determined very precisely by computing an inverse trigonometric function.

More specifically, the following method can be used as disclosed in for example Jikkaihei No. 1-173604 published by the Japanese Patent Office.

FIG. 9 shows the waveform output from the magnetic sensors. The two sensor outputs which differ in phase by 90° may be regarded as (sin) wave and (cos) wave. In this case, the sensor outputs y1, y2 due to the displacement of the piston rod within one pitch $(0-2\pi)$ of the magnetic scale are given respectively by:

$y_1 = V_1 \sin \theta$ $y_2 = V_2 \cos \theta$ $V_1$ and $V_2$ are peak voltages determined by the characteristics of the magnetic sensor and of the magnetic scale. If the gain can be adjusted such that $V_1 = V_2$, we then obtain:

$$\tan \theta = \sin \theta / \cos \theta = y_1/y_2$$

An angular displacement $\theta$ may be determined from the sensor outputs $y_1$, $y_2$, i.e.:

$$\theta = \tan^{-1}(y_1/y_2).$$

If we find $\theta$, therefore, the piston rod displacement (fine displacement) within 1 pitch (or ½ pitch) may be computed from:

$$\Delta l = (p/2\pi) \cdot \theta$$

where p is the pitch.

A coarse displacement at every pitch (½ pitch) on the magnetic scale can be found by observing the peak voltage or the center voltage (center value of the amplitude) of the sensor output. By adding this coarse displacement to the fine displacement between pitches, therefore, the actual displacement within 1 pitch can be measured with extremely high precision.

This displacement computation however assumes that $V_1 = V_2$ due to gain adjustment of peak voltages of sensor voltages. The two sensor outputs, however, may not always have the same amplitude and center voltage, but may vary at every pitch due to unevenness in the characteristics of the magnetic resistors comprising the magnetic sensors, unevenness in the depth of non-magnetic material in the piston rod or temperature variations. Unless these variations are compensated, therefore, the precision of the displacement that is computed cannot always be guaranteed.

As shown in FIG. 10, differences in depth of non-magnetic material at each pitch of the magnetic scale give rise directly to variations in the amplitudes of the output signals from the magnetic sensors. In addition, there will naturally be a difference between the center voltages of the magnetic sensors, drifts in the center voltages due to temperature variations, and variations of amplitude.

It is therefore impossible to compensate fluctuations, and in particular differences of amplitude at each pitch, merely by an initial gain adjustment of the magnetic sensors as described above, and it is thus difficult to detect the displacement with high precision. If the magnetic scale is embedded in the piston rod with high precision, it is of course possible to improve the precision of displacement detection. There is however a limit to this improvement, and if precision of the embedded depth is to be guaranteed, it necessarily entails a great increase in the cost of machining the piston rod.

SUMMARY OF THE INVENTION

The object of this invention is to permit fine detection of displacement without requiring mechanical precision by correcting the output signals from the magnetic sensors at each scale pitch.

To achieve this object, the displacement detecting apparatus of the present invention provides a magnetic scale formed by arranging pieces of non-magnetic material at a predetermined pitch in the direction of motion, a pair of magnetic sensors which output sine waves with a phase difference of 90° corresponding to the pitch of the magnetic scale, means for updating and storing the peak voltages output by the sensors at each pitch of the magnetic scale, means for computing the center voltages at each pitch from the peak voltages, means for computing a coarse displacement based on observation of the center voltages, means for computing correction coefficients of the sensor outputs from the peak voltages and center voltages, means for correcting the sensor outputs according to said correction coefficients, means for computing a fine displacement by calculating an inverse trigonometric function using the two corrected signals with different phases, and means which outputs a displacement signal by adding said coarse displacement to said fine displacement.

The peak voltages of the sensor output signals are updated and stored in a memory at each pitch, and the correction coefficient is taken as the reciprocal of the difference of the peak voltages and center voltages at each pitch.

The sensor outputs at each scale pitch are compensated by multiplying the actual sensor outputs by this correction coefficient, which equalizes the amplitude levels.

From the two corrected signals with different phases, a coarse displacement and a fine displacement are computed, and a displacement signal is computed by adding them. Output variations due to unevenness of the magnetic scale, etc., can thus be compensated, and a very precise displacement signal can be output.

BRIEF DESCRIPTION OF THE DRAWINGS

FIG. 5 is a flowchart for updating peak voltages.

DETAILED DESCRIPTION OF THE PREFERRED EMBODIMENTS

Figure 1:
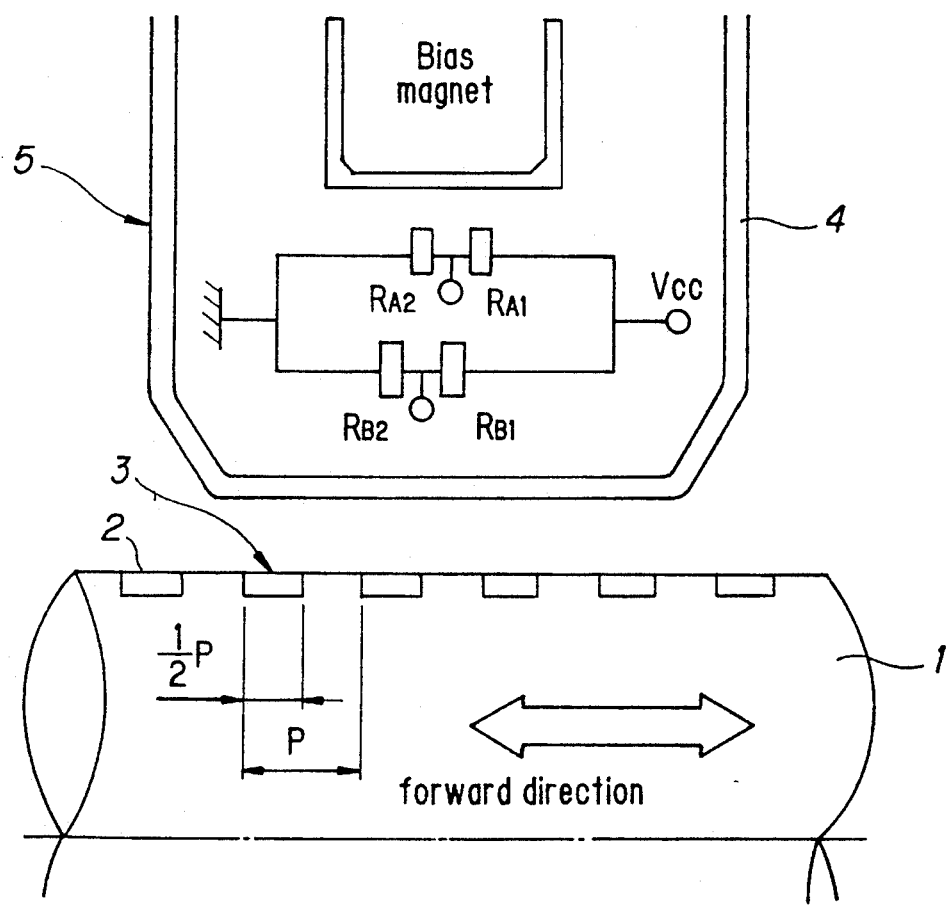
FIG. 1 is an enlarged illustration of the sensor in one embodiment of the present invention.

FIG. 1 shows an embodiment of this invention used to detect the displacement of a piston rod of a hydraulic cylinder.

Shallow hollows are formed at equal intervals on the surface of a piston rod 1 of magnetic material in its axial direction, and non-magnetic parts 2 of equal pitch are formed by for example embedding chips of non-magnetic material in these hollows so as to constitute a magnetic scale.

A pair of magnetic sensors 5 is provided on the side of the hydraulic cylinder, for example in the vicinity of a bearing 4, which output two sine waves of which one cycle corresponds to 1 pitch of the magnetic scale 3 and whose phase differs by 90° with the displacement of the piston rod 1.

Figure 2:
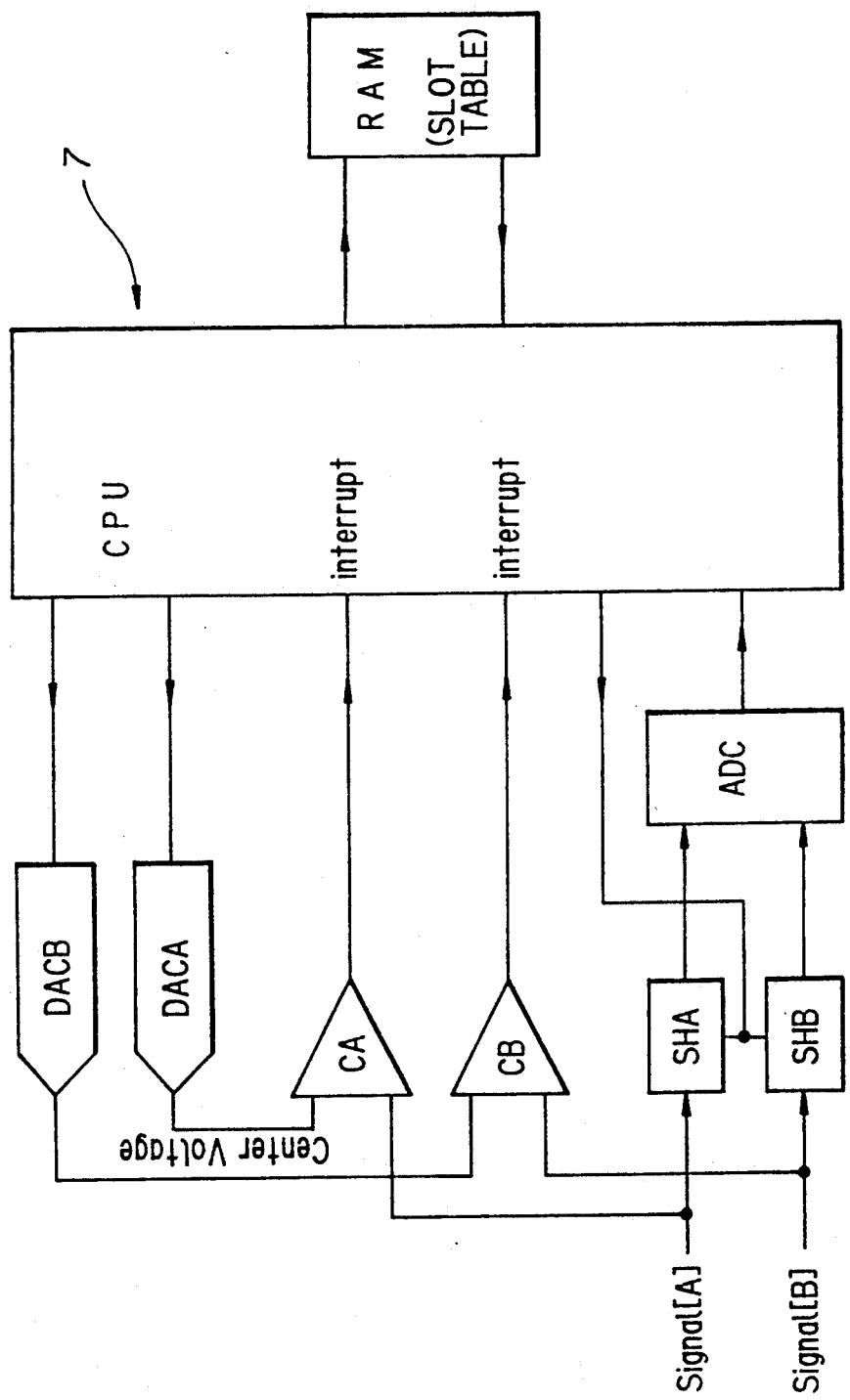
FIG. 2 is a block diagram of the controller.

As shown in FIG. 2, the two output signals A, B of different phase from magnetic sensors 5 are input to a controller 7 comprising a microprocessor, for example, and the displacement of the piston rod 1 is computed based on this information.

In principle, the controller 7 performs a compensation based on correction coefficients found from the peak voltages of the magnetic sensor output signals (described hereinafter) so as to make their amplitude levels constant at each pitch, finds a coarse displacement in ½ pitch units based on these corrected signals, finds a fine displacement by dividing each pitch interval into a predetermined number of parts, and computes the actual displacement by adding the coarse displacement to the fine displacement.

Said output signals A, B are input to a central processing unit (CPU) of the controller 7 via sample hold circuits SHA, SHB and an analog/digital converter ADC. SHA, SHB take the peak voltages (maxima and minima) of the sensor signals when these voltages are input to the memory RAM described hereinafter, and use them when the sensor signals are input to compute the fine displacement.

Comparators CA, CB compare each signal A, B with the center voltages of the maxima and minima at each pitch computed by the CPU. i.e. they compare the sensor signals A, B with the center voltages as references. If the signal is higher than the center voltage an H level signal is output, and if the signal is lower than the center voltage, an L level signal is output. DACA, DACB are digital/analog converters to perform analog conversion on the center voltages computed by the CPU.

Figure 3:
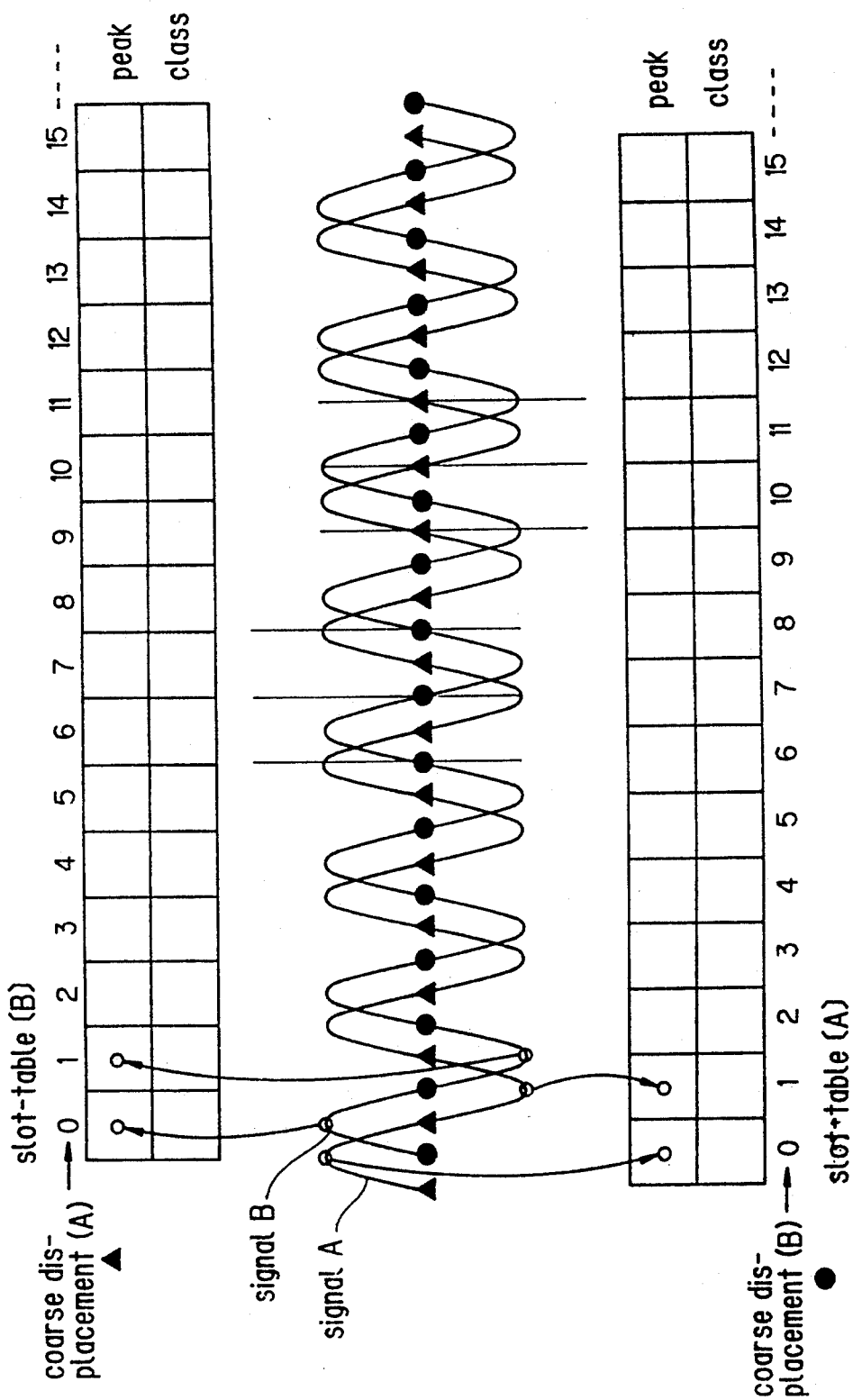
FIG. 3 is an illustration showing the way in which sensor signals and peak voltages are stored.

The memory RAM progressively updates and stores the peak voltages of the sensor signals A, B at each pitch. As shown in FIG. 3, the peak voltages (maxima and minima) are stored or signal A and signal B separately, and class values are assigned to them according to their reliability (the displacement is determined such that maximum values are even integers and minimum values are odd integers). Before the system is initialized, all values are guessed (class Gu).

When it is initialized, the first value is measured (class Me), and the next one is estimated (class Es). The latter however is subsequently updated to Me, which gives rise to another Es. In this way, Gu values are progressively replaced by Es values, and then by Me values. When the piston rod has completed one stroke, all values will be Me. These class values are weighting coefficients used to update the peak voltages in the manner described hereinafter. More specifically, if Me=1, Me>Es>Gu. The computations performed by the controller 7 shall now be explained with reference to the flowcharts of FIG. 4–FIG. 6.

Figure 6:
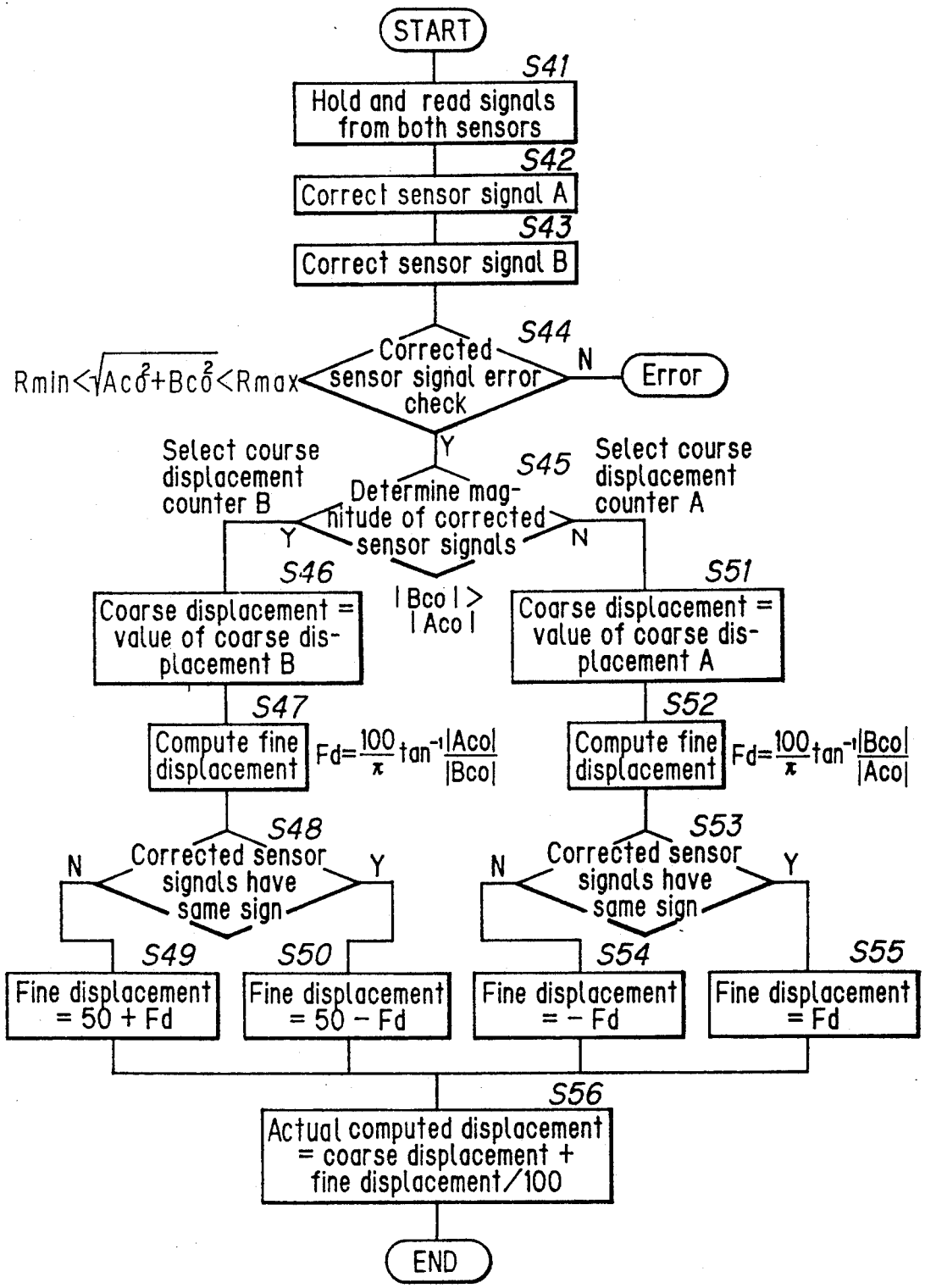
FIG. 6 is a flowchart for computing the displacement signal from the sensor signal correction, fine displacement and coarse displacement.

FIG. 6 is a flowchart for computing the actual displacement of the piston rod by finding a coarse displacement and a fine displacement from the sensor signals A, B. First, however, the computational process to determine the center voltages and correction coefficients of the sensor signals A, B will be described with reference to FIG. 4(A), (B), and the updating and storing process to determine peak voltages with reference to FIG. 5.

Figure 4A:
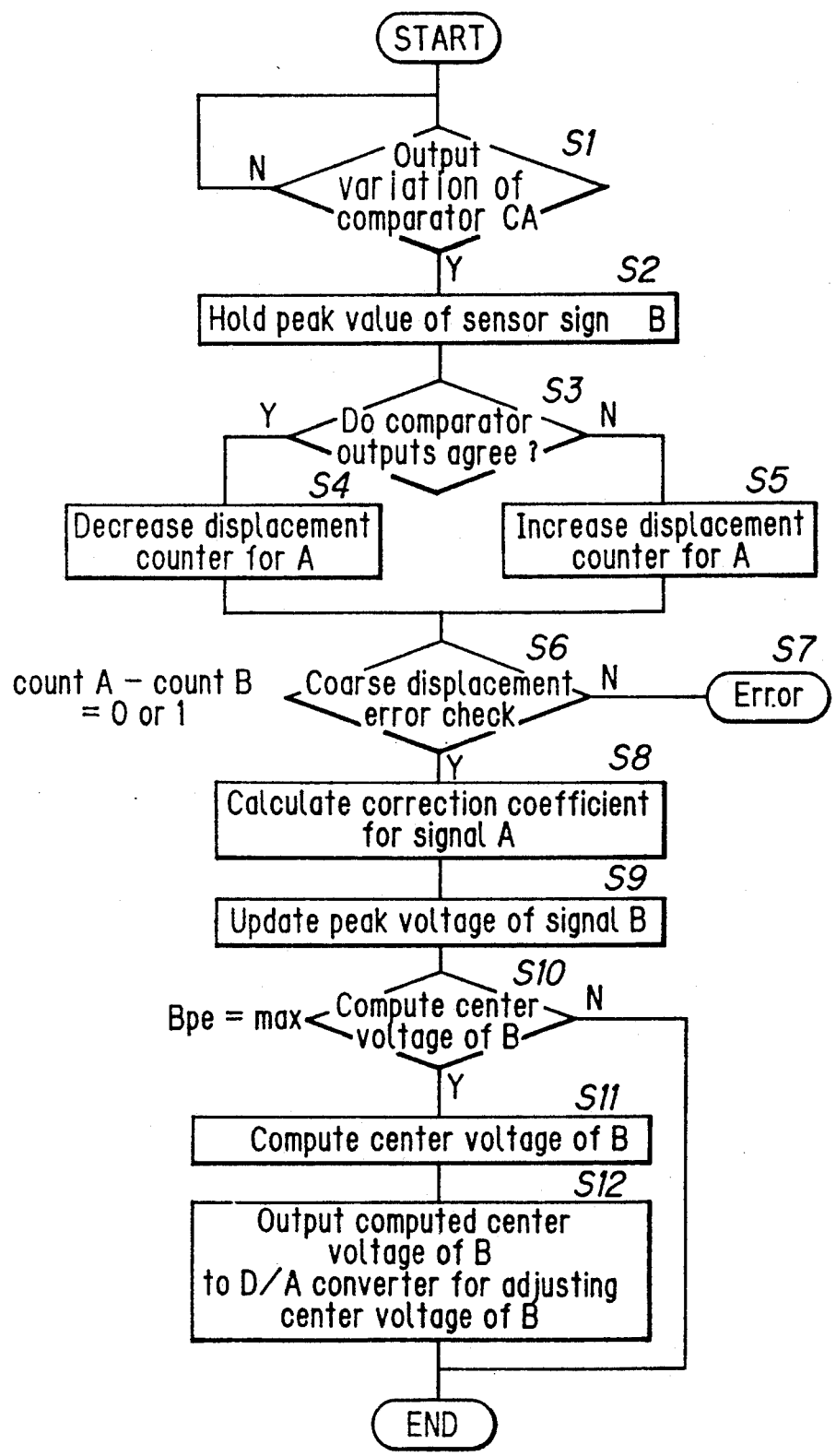
FIGS. 4(A), 4(B) are flowcharts for computing correction coefficients and center voltages.
Figure 4B:
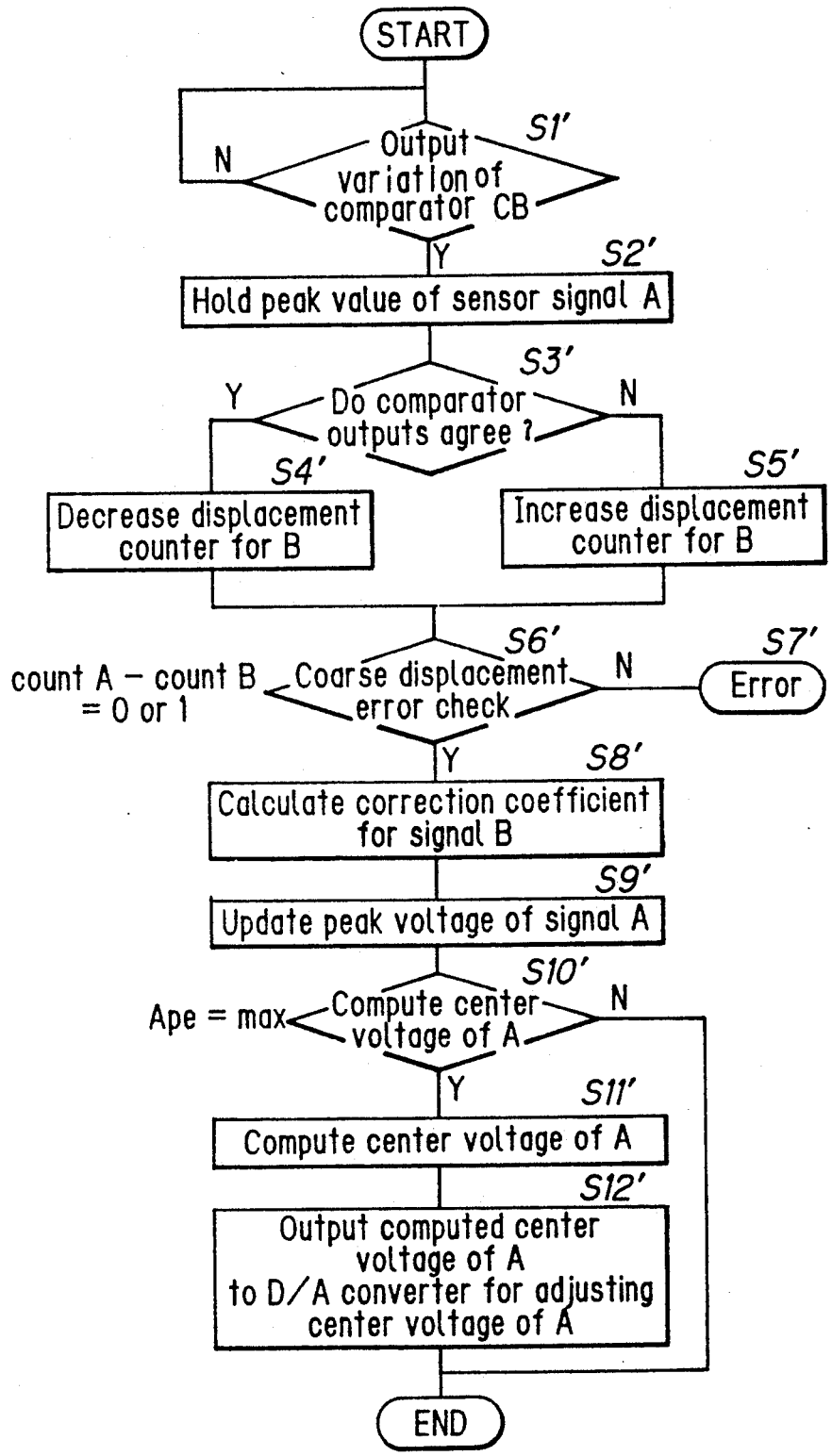

FIG. 4(A), 4(B) are executed when sensor signal A (sensor signal with phase A) and sensor signal B (sensor signal with phase B) respectively cross their center voltages. Firstly, in FIG. 4(A), when it is determined that the sensor signal A has crossed its center level by detecting that the output of comparator CA has varied, a command is issued to hold the peak voltage of the sensor signal 8 (steps 1 and 2).

As shown in FIG. 3, when the sensor signal A is at its center cross-over point, the sensor signal B has a maximum or minimum voltage, and this is held by a sample hold for computation of the center voltage and counting. The gathering and updating of peak voltages of signal B will be described with reference to the flowchart of FIG. 5.

By counting the number of times the sensor signal A has crossed its center voltage, a coarse displacement in 1 pitch or ½ pitch units of the magnetic scale is found. Furthermore, by determining the order of H and L between signals A and B output by the comparators CA, CB, the stroke direction can be judged. In one direction, the coarse displacement counter for A is decreased, while in the other it is increased (steps 4 and 5).

Figure 7:
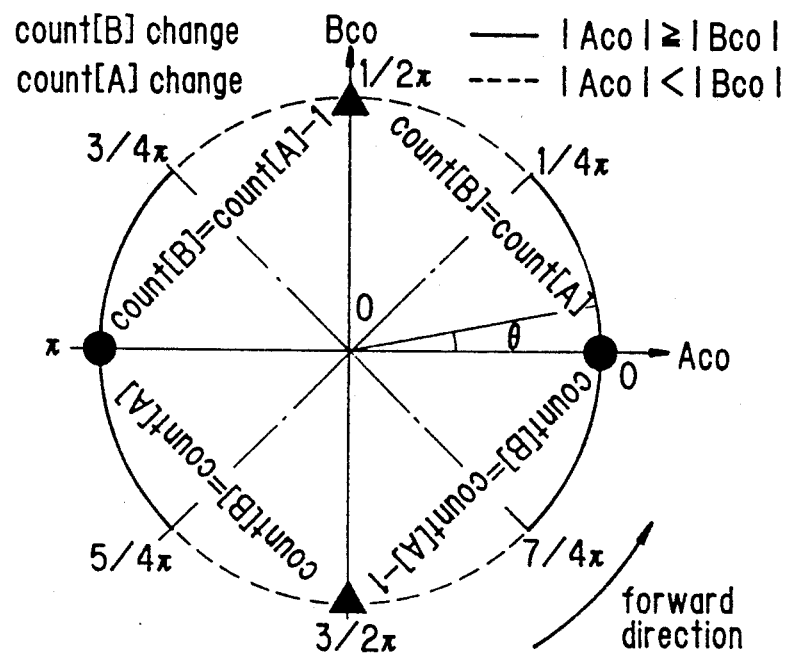
FIG. 7 is an illustration of the relation between coarse displacement counter values and quadrant positions in the composite amplitude characteristics of signals A and B.

As shown in FIG. 7, the coarse displacement counter A, and the coarse displacement counter B to be described hereinafter are first initialized such that the value of counter A − the value of counter B=0 or 1. If however the coarse displacement counters are not operating properly due to a break in the sensor signal wiring, excessive noise or a fault in the comparator output, the difference between the two counter values will then no longer be 0 or 1. This therefore permits an abnormality to be diagnosed immediately, in which case an error is output (step 7).

Next, in a step 8, a correction coefficient for signal A is computed from the peak voltage and center voltage. The correction coefficient compensates differences in the amplitude of the sensor output at each pitch of the magnetic scale, and thereby equalizes the output level over the whole scale. It is used when a correction is applied to compute the fine displacement of the piston rod.

This correction coefficient Asc is calculated as 1/|peak voltage Ape−center voltage Ace|. The peak voltage and center voltage of signal A are found by the routine of FIG. 4(B).

If for example the correct value of |peak voltage−center voltage| is 1, and the measured value is twice this figure (the center voltage, as will be described hereinafter, is determined as the intermediate voltage between the maximum and minimum voltages at each pitch), the correction coefficient will be $\frac{1}{2}$. As described hereinafter, by multiplying the amplitude of sensor signal A at every pitch with this correction coefficient, the value of the amplitude will always be 1. Next, the peak voltage of signal B which has been held, is updated (step 9). This updating is carried out according to the flowchart of FIG. 5 described hereinafter.

At a step 10, it is determined whether the timing is right to compute the center voltage of signal B. The center voltage is computed when the sensor signal is at its peak voltage (step 11).

The center voltage is basically computed as the intermediate voltage between the last maximum and minimum voltage within one pitch interval with increasing pitch in the stroke direction. However, as the center voltage itself does not vary much, it can also be computed as the average of the maximum and minimum voltages between several preceding and successive pitches.

The result of this computation is output as the center voltage of signal B to compute a coarse displacement, and guarantee the precision of displacement detection (step 12).

Next, processing is carried out when signal B crosses its center voltage. This is basically the same as the processing carried out when signal A crosses its center voltage except that, as it has opposite phase, the direction of up and down counts is reversed.

As shown in FIG. 3, when signal B crosses its center voltage, signal A has its peak voltage. In the same way as described heretofore therefore, an updated value of the peak voltage and the center voltage of signal A are computed, and at the same time, a correction coefficient for signal B is computed (steps 1'-12').

Next, the updating of peak voltages in FIG. 5 is performed on signals A and 8 with opposite phases. This is done by checking the class value (Gu, Es or Me) of one sensor signal when the other signal crosses its center voltage (steps 21, 22).

Updated peak voltages are then computed using the class value as a weighting coefficient (steps 23-26).

This computation is performed by taking the result of multiplying the peak voltage already stored with the weighting coefficient selected, adding the result of multiplying the present peak voltage with a reference coefficient (Ta), and dividing by the result of adding the reference coefficient and the weighting coefficient. As mentioned heretofore, if Me=1, the weighting coefficients have the relationship Me>Es>Gu, and Ta is normally 1. Further, this reference coefficient may be expressed as (1/number of times updating is performed), and Ta may also be greater than 1 to give priority to the present peak voltage.

Updating of peak voltages also takes account of errors in the signals which are read. In order to approximate estimated voltages to real voltages as soon as possible even when measured voltages have not yet been stored and increase the precision of the computation, averages of present peak voltages corrected by weighting coefficients are calculated, and stored as updated peak voltages.

In steps 28-33, if the peak voltages at two positions before and after the present peak voltage stored (if the peak voltage is a maximum, this corresponds to the two maxima stored at the preceding and following pitch) are initial guesses (Gu), the present peak voltage is stored and its class is replaced by Es. In this way, preceding and subsequent estimates of peak voltages that have been stored are approximated to real voltages as soon as possible on the basis of measured voltages up to the present time.

More specifically, in steps 28-30, the class of the two following peak voltages is checked. If they are guesses (Gu), the stored peak voltage is updated to a present peak voltage and its class is replaced by Es. Then, in steps 31-33, the class of the two preceding peak voltages is checked, and if they are estimates, they are updated and replaced.

If it is determined by the class check that the peak voltage is an estimated value (Es) or a measured value (Me), it is not updated and the class is not replaced.

Next, it shall be described how the displacement is computed. This is done by correcting the signals A and B using center voltages, peak voltages and correction coefficients to find a coarse displacement and a fine displacement, and adding the two as described hereintofore.

First, signals A and B are held by a sample hold, subjected to A/D conversion, and read as sensor signals As and Bs (step 41).

Figure 10:
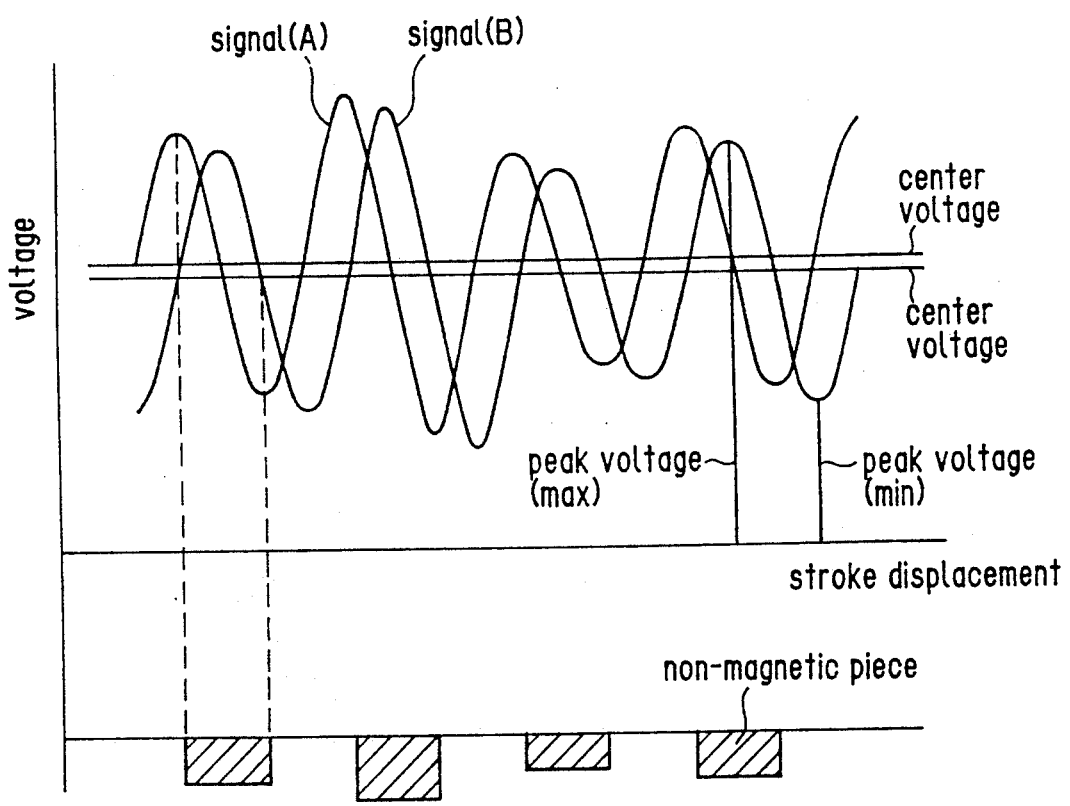
FIG. 10 is an illustration of the actual sensor signal output waveforms.

The corrected signal Aco is found by subtracting the center voltage Ace from the sensor signal As, and multiplying with a correction coefficient Asc described hereintofore, and a corrected signal Bco is computed in the same way. This adjusts the amplitude levels so that they are equal at each pitch as described hereintofore. Thus, even if the signal amplitudes at each pitch are different as shown in FIG. 10, they can be corrected to signals with a fixed amplitude.

Next, in a step 44, the combined amplitude of these corrected signals is found, and it is determined whether or not the corrected signals have errors.

Figure 8:
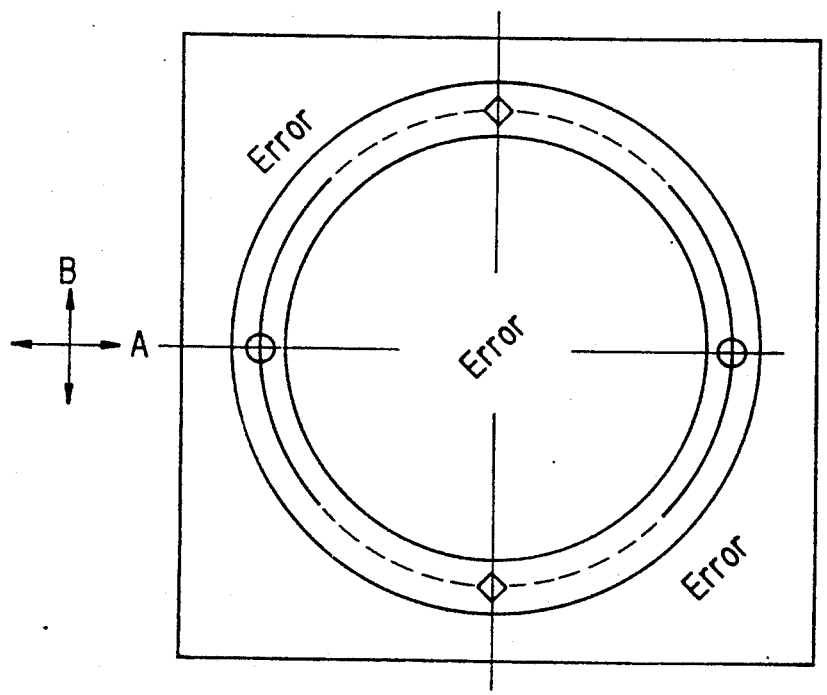
FIG. 8 is a similar illustration of combined amplitude.
Figure 9:
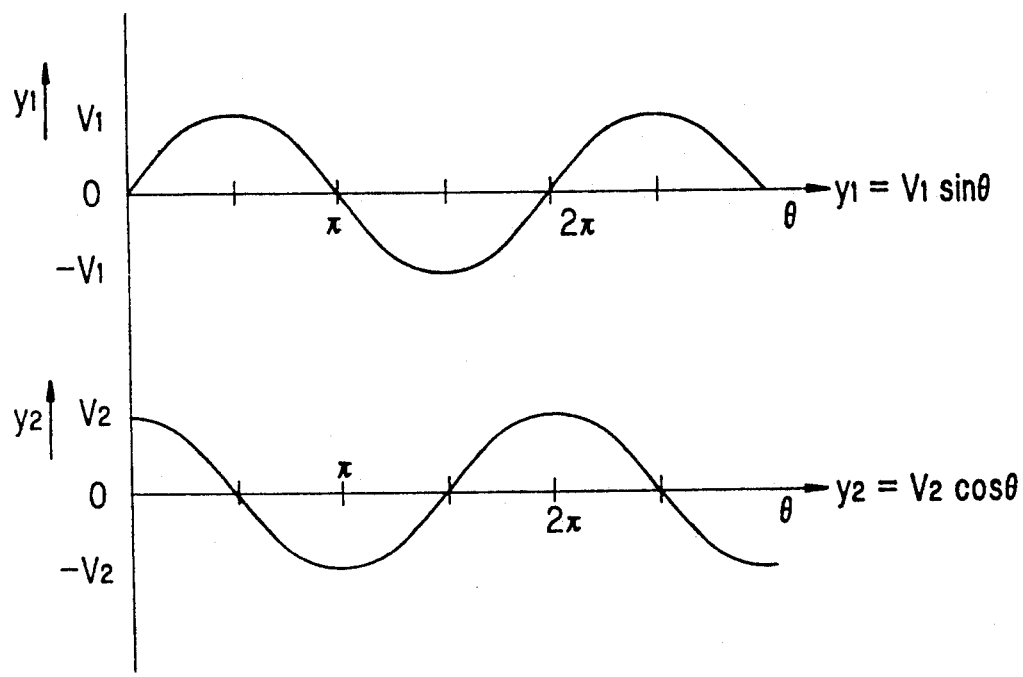
FIG. 9 is an illustration showing the displacement computation of the prior art.

FIG. 8 is a graph for determining the range of correct values. The two signals correspond to $\sin\theta$ and $\cos\theta$. If a predetermined zone is define with respect to the circles drawn by $(\sin^2 + \cos^2\theta = 1)$, and the combined signal amplitude is within this zone, it is confirmed that both corrected signals Aco and Bco are within correct limits. If the combined amplitude is outside this zone, on the other hand, it is judged that the corrected signals are not so reliable and an error is output.

This zone may be determined taking account of the allowable phase difference between the sensor signals and allowable noise level, etc. It enables a check to be performed to guarantee high precision of displacement detection, and a check to be performed or faults due to breaks in sensor signal wiring, short circuits and so on.

Next, provided that there are no errors, the values of the counters denoting the coarse displacement are taken, and a fine displacement is computed based on the corrected signals A, B. As the sensor signals contain some noise, the values of the coarse displacement counters may not be very reliable inside the small angular range just before and after the center cross-over point. If the counter value is taken immediately when the signal crosses the center voltage, therefore, there may be unexpected errors if this value is simply added to the fine displacement. The precision is therefore increased by using two coarse displacement counters, one for A and one for 8, selecting the counter value which does not vary over a certain region, and adding this to the fine displacement.

The computation begins by determining the region defined by 45° lines on a circular trace ($\sin^2 \theta + \cos^2 \theta = 1$) of the combined amplitude of the corrected signals (Aco-Bco) shown in FIG. 7, in which the present displacement of the piston rod is located.

As shown in this figure, 45° lines are the $\{(\frac{1}{4}), (\frac{3}{4}), (5/4). (7/4)\pi\}$ lines. Further, the values of displacement counters A and B coincide with or differ from each other depending on their position relative to the vertical and horizontal axes as boundaries.

In each of the 4 regions divided by the 45° lines, the coarse displacement counter for one o the signals is varying. If the counter value one region before that of the present position is chosen, therefore, a stable and correct coarse displacement can be determined.

After determining the region from the magnitude of the absolute values of the corrected signals Aco and Bco in a step 45, the coarse displacement is calculated and the fine displacement is calculated from an inverse trigonometric function as described hereintofore. In steps 45-50, in regions where the absolute value of corrected signal Bco is greater than that of Aco, the coarse displacement counter for signal B is chosen and a coarse displacement is found from the counter value for signal B.

A fine displacement is then calculated as $100/\pi . \tan^{-1} |Aco/Bco|$, i.e. in terms of the deviation from the vertical axis (Bco axis). In this case, the magnetic scale pitch is set at 2 mm (the coarse displacement is then expressed in 1 mm units), and a fine displacement can be obtained by dividing this coarse displacement unit into 100 parts (the fine displacement will then be expressed in 0.01 mm units). If further precision is required, the coarse displacement unit may be divided not into 100 parts but into 1000 parts. The constant in the above expression is then 1000, and a fine displacement can be found to the nearest 0.001 mm.

Further, $\tan^{-1}$ was used for the inverse trigonometric function, but the processing may also be carried out by $\sin^{-1}$ and $\cos^{-1}$ using the combined amplitude of the corrected signals. If a fine displacement Fd is found in this way, compensation is performed by determining whether the signs of the corrected sensor signals Aco and Bco are identical in a step 48.

If the signs are different, the compensated fine displacement is given by (50+Fd) in a step 49, while if the signs are the same, the compensated fine displacement is given by (50−Fd).

However, if the absolute value of the corrected signal Aco is greater than Bco in the step 45, the program proceeds to steps 51-55, the counter value for signal A is taken as a coarse displacement, the fine displacement is calculated as $Fd = (100/\pi)\tan^{-1}|Bco/Ac|$ or the deviation from the horizontal axis, and the fine displacement is given after determining whether the signs of the two corrected signals are identical.

If the signs coincide, the fine displacement is output as (Fd) in a step 55, while if they do not, the fine displacement is output as (−Fd) in a step 54.

As shown in FIG. 7, signal B crosses its center voltage at $0 \to \pi \to 0(2\pi)$, and signal A crosses its center voltage at $(\frac{1}{2})\pi \to (3/2)\pi \to (\frac{1}{2})\pi$.

From $(7/4)\pi$ to $(\frac{1}{4})\pi$, the counter value for signal A which does not vary over this range, may be taken as the coarse displacement signal; from $(\frac{1}{4})\pi$ to $(\frac{3}{4})\pi$, the counter value for signal B may be taken; from $(\frac{3}{4})\pi$ to $(5/4)\pi$, the counter value for signal A may be taken; and from $(5/4)\pi$ to $(7/4)\pi$, the counter value for signal B may be taken. The actual displacement signal is then obtained by adding this to the fine displacement signal.

As described hereintofore, the fine displacement is given by dividing ½ pitch intervals on the magnetic scale into 100 parts. The region $0 \to \pi$ is therefore divided into 100 equal parts, and the region $\pi \to 0 (2\pi)$ into 100 equal parts.

In the angle range $\theta = 0 - (\frac{1}{4})\pi$, the absolute value of sensor signal A is large. As the signs of both sensor signals are then identical, the fine displacement Fd may simply be added to the coarse counter value of signal A (e.g. N) to give an actual stroke displacement $St = N + Fd/100$.

In the angle range $\theta = (\frac{1}{4})\pi - (\frac{1}{2})\pi$, the absolute value of sensor signal B is large and the signs of both sensor signals are identical. The fine displacement $50 - Fd$ is thus added to the coarse counter value of signal B (N).

At the angle $\theta = (\frac{1}{2})\pi$, for example, $Fd = 0$, the fine displacement = 50, and the actual stroke displacement $St = N + 50/100$.

In the angle range $\theta = (\frac{1}{2})\pi - (\frac{3}{4})\pi$, the absolute value of sensor signal B is large and the signs of the sensor signals are different. The fine displacement is then $50 + Fd$ and this is added to the coarse counter value of signal B (N).

The actual stroke displacement is thus $St = N + (50 + Fd)/100$.

In the angle range $\theta = (\frac{3}{4})\pi - \pi$, the absolute value of sensor signal A is large and the signs of the sensor signals are different, so the fine displacement is corrected to $-Fd$. The coarse displacement is then the value of the coarse displacement counter for signal A (N+1), so $St = (N+1) - Fd/100$. Further, if the stroke is in the forward direction as shown in the diagram, N is increased to N+1 at the position $\pi/2$. If the stroke is in the reverse direction, the value of the counter is decreased at the position $3\pi/2$ and the coarse displacement counter for signal A is then N+1 as when the piston is moving in the forward direction.

When the angle $\theta = \pi$, $Fd = 0$, and the value of the coarse counter for signal A, (N+1), indicates the displacement.

Further, in the angle range $\theta = \pi - 2\pi(0)$, the displacement can be computed in the same way as above.

In a step 56, the coarse displacement and fine displacement are added together to output a stroke signal St. In this way, the actual displacement is interpolated by dividing the interval between coarse displacements into 100 parts to find a fine displacement, and the displacement can then be computed with high resolution.

According to the the present invention, therefore, the peak voltages of the magnetic sensor signals are updated and stored at every pitch of the magnetic scale over the entire stroke of the piston rod. Even if the sensor output signals fluctuate at each pitch due to errors in the machining of the magnetic scale, or even if there are temporal variations or fluctuations due to temperature changes, therefore, the amplitude levels of the sensor signals are adjusted to be constant and the center voltage is also adjusted based on this updated information. A stable and accurate displacement detection is therefore always obtained.

What is claimed is:

1. An apparatus for detecting the displacement of a piston rod in a cylinder comprising:
    a magnetic scale comprising a non-magnetic material embedded in the piston rod with a predetermined pitch interval in the direction of motion of said piston rod,
    a pair of magnetic sensors positioned to output two sine waves with a phase difference of 90° with respect to the pitch interval of said magnetic scale,
    means for updating and storing the peak voltages output by said sensors at each pitch interval of the magnetic scale,
    means for computing a center voltage of the oscillation from said peak voltages at each pitch interval,
    means for computing a coarse displacement from the result of comparing said computed center voltages and said sensor outputs,
    means for computing correction coefficients of said sensor outputs from said peak voltages and said center voltages,
    means for compensating said sensor output signal from said correction coefficients to produce two compensated signals,
    means for computing and outputting a fine displacement signal from an inverse trigonometric function using said two compensated signals, and
    a displacement computing means for outputting a displacement signal comprising means for adding said coarse displacement to said fine displacement signal,
    said peak voltage updating and storing means comprising means for memorizing the peak voltages output by the sensors over the entire stroke of the piston rod.

2. The apparatus as defined in claim 1 wherein the updating and storing means comprises means for memorizing sine wave maxima and minima.

3. The apparatus as defined in claim 1 wherein said updating and storing means comprises means for storing estimated voltages as initializing values before the peak voltages actually measured are input.

4. The apparatus as defined in claim 1 wherein said peak voltage updating and storing means comprises means for memorizing class values representing the reliability of the peak voltages together with the peak voltages of the sensor outputs.

5. The apparatus as defined in claim 4 comprising means for modifying the class values memorized by said updating and storing means according to the reliability of the peak voltages stored together with them.

6. The apparatus as defined in claim 5 wherein said updating and storing means comprises means for updating peak voltages by compensating input measured voltages based on the peak voltages and class values already stored.

7. The apparatus as defined in claim 1 wherein said center voltage computing means comprises means for computing center voltages as intermediate voltages between the maxima and minima of the sensor outputs within one pitch.

8. The apparatus as defined in claim 1 wherein said center voltage computing means comprises means for computing center voltages as average values of the maxima and minima of the sensor outputs over several pitches.

9. The apparatus as defined in claim 1 wherein said coarse displacement computing means comprises means for computing a coarse displacement when the sensor outputs cross the center voltage.

10. The apparatus as defined in claim 1 wherein said correction coefficient computing means comprises means for computing correction coefficients as the reciprocal of the absolute values of the differences between said peak voltages and said center voltages.

11. The apparatus as defined in claim 1 wherein said sensor output compensating means comprises means for computing two corrected signals by subtracting the center voltages from said sensor outputs, and multiplying the result by the correction coefficients.

12. The apparatus as defined in claim 11 wherein said sensor output compensating means comprises means for judging the corrected signal to be correct when the combined amplitude of said two corrected signals is within a predetermined range.

13. The apparatus as defined in claim 11 wherein said fine displacement computing means comprises means for computing a fine displacement based on said two corrected signals as $N/\pi \cdot \tan^{-1}|Aco/Bco|$ where N is a natural integer and Aco and Bco are corrected signals.

14. The apparatus as defined in claim 1 wherein said coarse displacement computing means comprises means for selecting a coarse displacement from the magnitudes of the absolute values of the two corrected signals.

15. The apparatus as defined in claim 14 wherein said coarse displacement computing means comprises means for adding a coarse displacement signal to said fine displacement signal.

* * * * *